United States Patent

Tack et al.

[11] 4,333,403
[45] Jun. 8, 1982

[54] RETAINER RAILWAY CAR TRUCK BOLSTER SPRING

[75] Inventors: Carl E. Tack, Elmhurst, Ill.; Sergei G. Guins, Okemos, Mich.

[73] Assignee: TransDyne, Inc., Chicago, Ill.

[21] Appl. No.: 28,265

[22] Filed: Apr. 9, 1979

[51] Int. Cl.³ .......................... B61F 5/06; F16F 1/06; F16F 1/12; F16F 3/04

[52] U.S. Cl. .................... 105/197 R; 267/4; 267/168; 267/179

[58] Field of Search .............. 105/197 R; 267/4, 60, 267/61, 62, 168, 3, 169, 179

[56] References Cited

U.S. PATENT DOCUMENTS

| 83,855 | 11/1868 | Horner | 267/4 |
|---|---|---|---|
| 138,675 | 5/1873 | Middleton, Jr. | 267/4 |
| 208,904 | 10/1878 | Godley | 267/4 |
| 292,775 | 1/1884 | Vose | 267/4 |
| 304,990 | 9/1884 | Cliff | 267/4 |
| 531,910 | 1/1895 | Cloud | 267/4 |
| 571,972 | 11/1896 | Janney | 267/168 X |
| 3,030,056 | 4/1962 | Rogers | 267/168 X |
| 3,556,504 | 1/1971 | Sinclair | 267/4 |
| 4,148,469 | 4/1910 | Geyer | 267/4 |
| 4,186,914 | 2/1980 | Radwill et al. | 267/4 |

Primary Examiner—Joseph F. Peters, Jr.
Assistant Examiner—Howard Beltran
Attorney, Agent, or Firm—Gary, Juettner & Pyle

[57] ABSTRACT

One or more of the springs supporting the bolster of a railway car truck is a two stage spring group comprising an outer coil and an inner coil disposed within and coaxial with the outer spring. A retainer is provided to hold the inner spring in relation to the outer spring. The retainer has helically arranged lugs or a flange in engagement with the outer coil at the lower end, and the retainer also includes a support surface for supporting the lower end of the inner coil.

8 Claims, 9 Drawing Figures

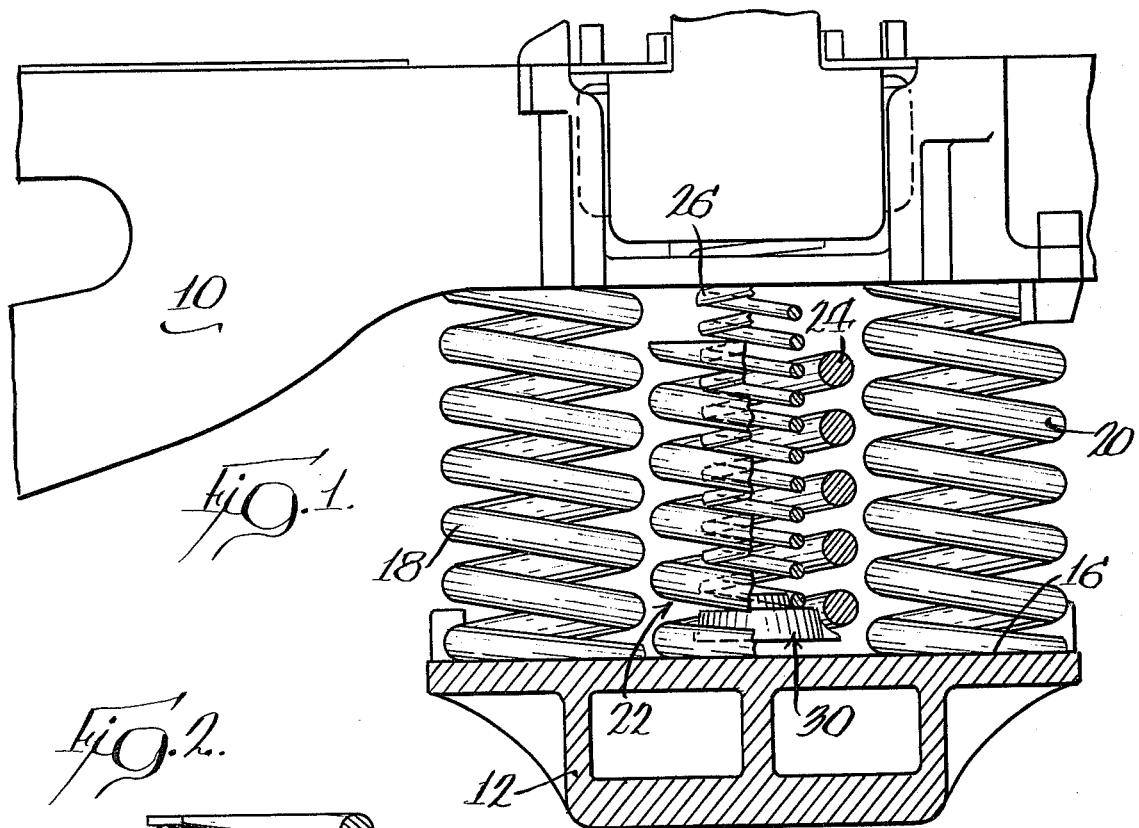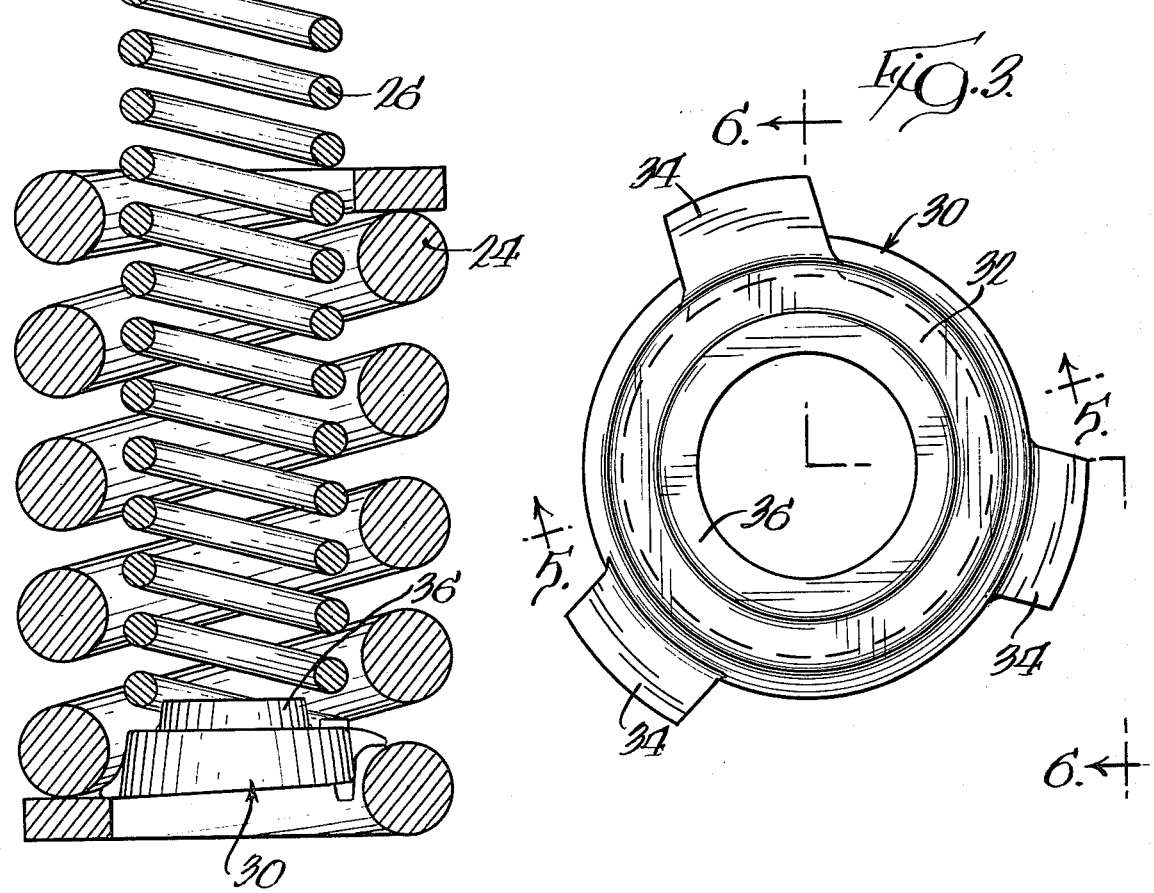

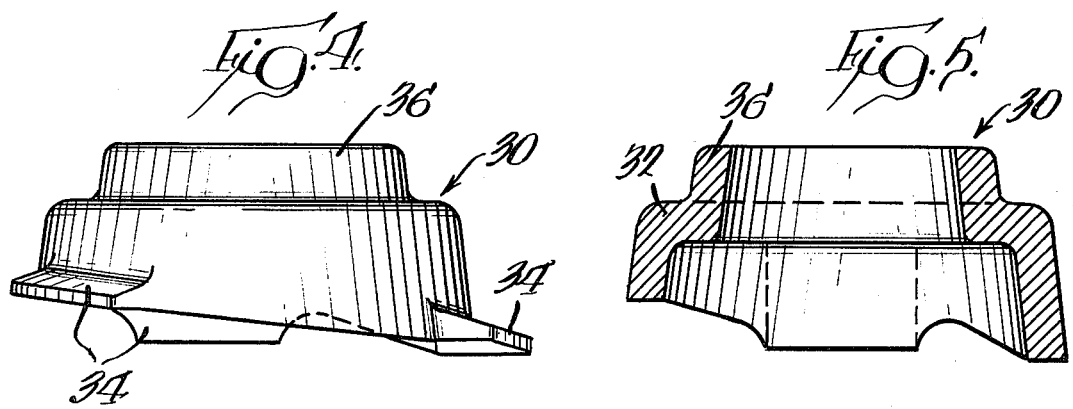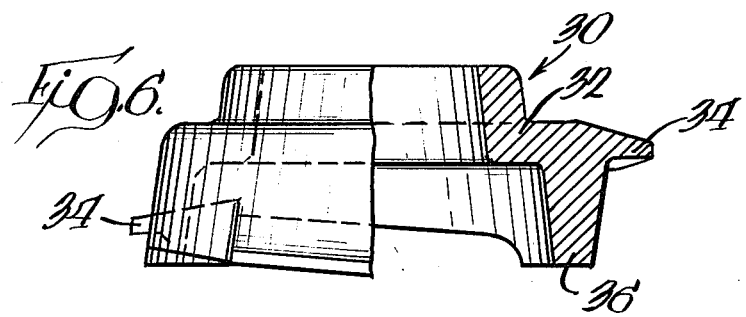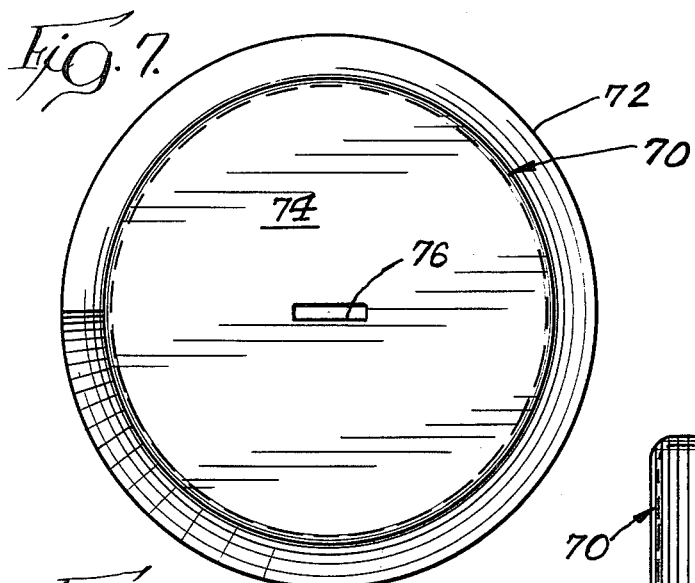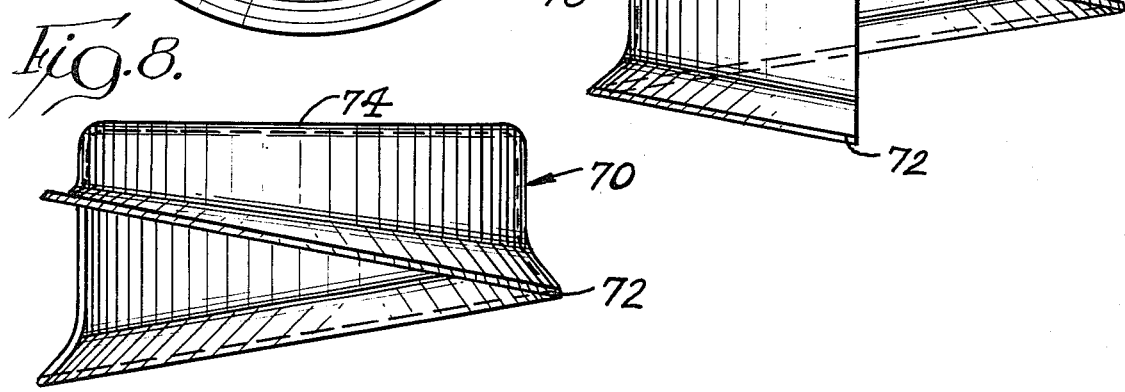

RETAINER RAILWAY CAR TRUCK BOLSTER SPRING

BACKGROUND OF THE INVENTION

It is well known that a conventional railway car truck comprises a pair of wheel-supported side frames, with a car-supporting bolster extending between the side frames. The ends of the bolster are slidably mounted in large openings or windows in the side frames, and each bolster end is resiliently supported upon a plurality of spring groups or coils in respective side frames. Depending on whether the railway or car is loaded, the bolster spring groups or coils are relatively compressed or extended.

Many arrangements have been proposed for providing proper spring support for the bolster and car body to satisfy both loaded and unloaded conditions. In accordance with one proposal, one or more of the outer coils may be shorter than the inner coils, such that the outer coil is not compressed under unloaded conditions but is engaged and provides resilient support when the car is loaded. In order to prevent this shorter coil from tilting to the side and interfering with adjacent springs during an unloaded conditions, it is known to dispose a small diameter coil within the short coil. The inner coil is longer than the short coil and extends fully between the bolster and side frame under unloaded conditions in order to retain the short coil in position.

It has been found that when a two stage spring as described above is employed, some means must be provided to retain or hold the lower end of the inner coil relative to the outer coil; otherwise, the outer coil will tilt sufficiently to interfere with the inner coil or another adjacent coil. The lack of a suitable retaining means has discouraged the extensive use of such two stage springs by the industry.

SUMMARY OF THE INVENTION

The present invention provides a retainer for retaining the base of a bolster support coil relative to the base of an inner coil, thereby preventing lateral movement or tilting of the outer coil. The retainer includes a body having means for locking the body into the lowermost portion of the outer coil, and the body includes an upper or other surface for supporting and positioning the bottom of the inner coil.

More specifically, the retainer comprises a body having a plurality of helically arranged lugs corresponding generally to the helix of the outer coil, such that the body may be threaded into the bottom of the outer coil. The upper surface of the body includes a central boss on which the inner spring is supported and positioned. In another embodiment, the body has a continuous spiral flange to engage the outer coil.

THE DRAWINGS

FIG. 1 is a view, partly in section, of a portion of a railway truck, which illustrates resilient support of a bolster in one of the side frames and the use of a two stage spring system and the spring retainer of the present invention.

FIG. 2 is a vertical sectional view of the two stage spring system of FIG. 1 together with the retainer of the present invention.

FIG. 3 is a plan view of the retainer of the present invention.

FIG. 4 is an elevational view of the retainer shown in FIG. 3.

FIG. 5 is a sectional view taken along line 5—5 of FIG. 3.

FIG. 6 is a partial sectional view taken along line 6—6 of FIG. 3.

FIG. 7 is a plan view of another embodiment of the spring retainer of the present invention.

FIGS. 8 and 9 are side views of the retainer of FIG. 7.

DESCRIPTION OF THE PREFERRED EMBODIMENTS

Inasmuch as the structure of a railway car truck is conventional and well known, only those portions that are necessary for an understanding of the present invention will be described herein. As shown in FIG. 1, a bolster 10 is suspended between a pair of side frames, of which one is shown at 12. Each end of the bolster is supported upon a plurality of spring coils 18 and 20 which rest on a lower surface 16 in a opening in the side frame. Elements of the overall arrangement that are not shown include the car body that is supported by the bolster 10 and wheel and axle assemblies that support the side frames 12 over the track system.

Although various numbers and arrangements of coils may be used to support the bolster, one typical arrangement is shown in FIG. 1 wherein at least two pairs of side coils such as 18 and 20 are provided in a spaced relation and have a two stage spring group 22 located therebetween. It may be seen that the two stage spring group 22 includes an outer coil 24 having a diameter of the same order as the side coils 18 and 20 but being significantly shorter than the side coils. The spring group 22 also includes an inner coil 26 having a small enough diameter to fit within the outer coil 24 in a spaced coaxial relationship.

FIG. 1 illustrates the truck in an unloaded condition wherein the bolster 10 is supported by the side coils 18 and 20 and the inner coil 26 of the two stage spring group 22. In an unloaded or lightly loaded condition, the top edge of the outer coil 24 of the two stage spring is spaced from the lower surface of the bolster and is thus unsupported. When the car is loaded, the side coils 18 and 20 and inner coil 26 compress until the short coil 24 is engaged, so as to provide an added degree of resilient support under loaded conditions.

It will be apparent that the spring arrangement may comprise multiple two stage spring groups such as 22, and the outer coils of each may differ in free height, such that as progressively increasing loads are experienced, the tops of respective outer coils will be engaged in a progressive or successive manner, thus providing a multiple stage effect of increasing load carrying capacity.

It may be seen that during unloaded conditions, there is no support for the top of the shorter coil 24, and unless some type of retainer is provided, this coil could wobble, tilt or move sideways under service conditions and could jam into or otherwise interfere with adjacent coils, causing loss or impairment of ride control.

In accordance with the present invention, a novel spring retainer, generally indicated at 30, is provided to retain the short coil 24 in a fixed coaxial relationship with the inner coil 26 and to prevent sideways movement or tilting of the short coil. The retainer 30 and its relationship to the coils 24 and 26 are illustrated in detail in FIGS. 2 through 6.

The retainer 30 is preferably a unitary metal body formed by casting, forging, or another suitable process. The retainer includes means for engaging or locking within the lower or bottom portion of the outer coil 24, and means for supporting and positioning the lower end of the inner coil 26 relative to and in a spaced relation from the outer coil.

Describing the preferred embodiment of the retainer in more detail, it may be seen that the retainer 30 comprises a generally cylindrical body 32 having a plurality of lugs or ears 34 extending out from the cylindrical surface at regular intervals. The ears 34 are arranged in a helical fashion on the body 32. The diameter of the body 32 is slightly less than the inner diameter of the coil 24, and the ears 34 are arranged such that the retainer may be threaded in the open lower end of the coil 24 before the coil is installed in the truck. Since the retainer is designed to be threaded only upon the first turn or the first two turns of the coil 24 the retainer will not retard or interfere with proper or complete compression of said coil.

The retainer 32 also includes a spring retaining boss 36 on the upper surface thereof, said boss having a diameter corresponding to the inner diameter of the inner spring 26 and less than the diameter of the cylindrical body 32. It may be seen that the boss 36 is located centrally within the body such that the inner spring 26 remains spaced from the outer spring 24.

The relation of the inner and outer coils to the retainer of the present invention will now be understood with reference to FIGS. 1 and 2. Under unloaded conditions, the inner coil 26 is slightly compressed between the bolster 10 and the retainer 30 and is held in position by the boss 36. The outer coil 24 is held in position by the combination of the inner coil 26 and the retainer 30.

Another embodiment of a spring retainer is shown in FIGS. 7, 8 and 9. In this embodiment, the retainer 70 is a cup-shaped member having a spiral flange 72 having a configuration for being threaded into the bottom of the outer coil. The retainer 70 has a wall 74 that is disposed horizontally upon installation, said wall serving to support the lower end of the inner coil. The wall may include a slot 76 to facilitate the threading installation by use of a screwdriver or similar tool.

It will be understood that the embodiment shown in FIGS. 7-9 may be used in the orientation shown or in an inverted position, provided only that the flange 72 is adapted to fit the helix of the outer coil. Another important feature of this embodiment is that the radius of the flange 72 increases from one end to the other. This is desirable because, as shown in FIG. 2, the radius of the outer coil 24 becomes more compact or flatter at the end, and the radius of the flange 72 is therefore designed to fit this flat configuration upon installation. The same is true of the lugs 34 of the retainer 30 described in the first embodiment.

From the foregoing, it may be seen that the retainers of the present invention offer a simple yet reliable means of retaining a short travel spring in position, especially under the unloaded condition described herein, and does not interfere with the proper function of the springs under any condition of loading.

We claim:

1. In a railway truck comprising a pair of side frames having windows therein for receiving the ends of a bolster, and a plurality of spring groups extending upward from the floor of said window and supporting said bolster, said spring groups including a two stage spring group comprising an outer coil and an inner coil in coaxial relation with the outer coil, and retainer means for retaining said inner and outer coils in coaxial relation, said retainer means and said outer coil having a mating helical relation supporting the retainer means above the side frame window floor.

2. A spring retainer for a two stage spring group in a railway truck, said two stage spring group comprising an inner coil received in an outer coil in coaxial relation and spaced therefrom, said spring retainer comprising a unitary body in mating helical engagement with said outer coil, said body being spaced above the lower end of the outer coil, and a central boss on the upper surface of said body, said inner coil being received over said boss.

3. A spring retainer for a two stage spring group in a railway truck, said two stage spring group comprising an inner coil received in an outer coil in coaxial relation, said spring retainer comprising a body having an upper surface for supporting the lower end of said inner coil, said body and said outer coil having a mating helical relation wherein said body is supported above the lower end of the outer coil.

4. The spring retainer of claim 3 wherein said body comprises a continuous helical flange extending from said body in mating helical engagement with said outer coil.

5. The spring retainer of claim 3 wherein said body is cup shaped.

6. The spring retainer of claim 3 wherein a plurality of spring groups are provided, the outer coil of one of said groups differing in free height from another of the outer coils.

7. The spring retainer of claim 3 wherein said body comprises a plurality of ears extending from said body in a helical fashion in mating helical engagement with said outer coil.

8. The spring retainer of claim 7 wherein the radius of said ears decreases from the upper ear to the lower ear, whereby to conform to the flattened configuration of the lower end of the outer coil.

* * * * *